United States Patent
Kondou

(10) Patent No.: US 8,558,186 B2
(45) Date of Patent: Oct. 15, 2013

(54) RADIOGRAPHIC IMAGE DETECTOR AND GAIN SETTING METHOD FOR RADIOGRAPHIC IMAGE DETECTOR

(75) Inventor: Kiyoshi Kondou, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 87 days.

(21) Appl. No.: 13/341,370

(22) Filed: Dec. 30, 2011

(65) Prior Publication Data

US 2012/0199750 A1 Aug. 9, 2012

(30) Foreign Application Priority Data

Feb. 9, 2011 (JP) ................................. 2011-025852

(51) Int. Cl.
*G01T 1/24* (2006.01)
*G06K 9/36* (2006.01)

(52) U.S. Cl.
USPC ..................................... 250/370.09; 382/254

(58) Field of Classification Search
USPC ........... 250/370.01, 370.08, 370.09; 382/128, 382/254, 275
See application file for complete search history.

(56) References Cited

FOREIGN PATENT DOCUMENTS

| JP | 11-094532 | 4/1999 |
|----|-----------|--------|
| JP | 2005-266072 | 9/2005 |
| JP | 2008-252424 | 10/2008 |
| JP | 2009-219538 A | 10/2009 |

*Primary Examiner* — Mark R Gaworecki
(74) *Attorney, Agent, or Firm* — Jean C. Edwards, Esq.; Edwards Neils PLLC

(57) ABSTRACT

In a radiography system, after a radiation dose, signal charges are accumulated in sensor pixels in an imaging area of a flat panel detector corresponding to the dosed amounts of radioactive rays on the pixels. The signal charges are read out from the pixels and converted into voltage signals representative of density levels of respective pixels of a radiographic image. Before reading the signal charges, a dose profile representative of distribution of the dosed amounts of radioactive rays is measured by leak currents from the pixels or bias currents through bias lines for applying a bias voltage to the pixels. Based on the contrast or difference between the maximum value and the minimum value in the dose profile, a gain of amplifiers for the voltage signals is determined such that the gain increases with decreasing contrast.

13 Claims, 12 Drawing Sheets

RADIOGRAPHIC IMAGE DETECTOR AND GAIN SETTING METHOD FOR RADIOGRAPHIC IMAGE DETECTOR

CROSS-REFERENCE TO RELATED APPLICATIONS

The present application claims priority from Japanese Patent Application No. 2011-025852, filed Feb. 9, 2011, the contents of which are herein incorporated by reference in their entirety.

BACKGROUND OF THE INVENTION

1. Field of the Invention

The present invention relates to a radiographic image detector and a gain setting method for the radiographic image detector.

2. Description of the Related Art

In the medical field, radiography systems utilizing radioactive rays such as x-rays for imaging are known. An x-ray radiography system includes an x-ray projector having an x-ray source for radiating x-rays, and radiographic equipment that receives x-rays after having been projected from the x-ray projector toward a subject and penetrating through the subject, thereby to acquire a radiograph or x-ray image that represents information on the subject. As the radiographic equipment, an x-ray image detector using a flat panel detector (FPD) in place of conventional x-ray film or an imaging plate (IP) has recently been developed and used in practice, which can output digital data of an acquired x-ray image, as disclosed in JPA 2009-219538.

As described in this prior art, the FPD includes a detection panel having an imaging area in which a large number of pixels are arranged in a matrix to accumulate signal charges corresponding to incident amounts of x-rays on the respective pixels, and a signal processing circuit for reading out the signal charges as digital image data. The signal processing circuit has a voltage output circuit for outputting the signal charges accumulated in the pixels as an analog voltage signal, and an A/D converter for converting the voltage signal to digital image data.

Through the A/D conversion, the voltage signal representing the amounts of charges accumulated in the pixels are converted to pixel levels that represent tonal levels in density gradation of the x-ray image. Each pixel level is expressed by a digital value within a dynamic range that is defined by the bit number of the A/D converter. The above-mentioned prior art discloses an FPD that can adjust amplification or gain of amplifiers for the voltage signal according to the dose of x-rays onto the FPD in order to make good use of the dynamic range of the A/D converter.

The x-ray dose on the FPD varies depending upon exposure conditions determined by the target site of radiography and other factors. Because the amounts of signal charges accumulated in the pixels increase in proportion to the radiation dose, the density of x-ray image will increase with the dose. In the above prior art, the dosed amount of x-rays is measured, and the gain is set low for high-dose images or high for low-dose images, so as to make effective use of the dynamic range of the A/D converter.

Applying a high gain to low-dose images boosts up the pixel levels so that low pixel levels representative of lower image densities may be tunable into the dynamic range of the A/D converter. By contrast, applying a low gain to high-dose images prevents pixel level saturation in the high density range so that the entire pixel levels are tuned into the dynamic range of the A/D converter. Thus, high-quality x-ray images may be provided with adequate density gradation.

The prior art suggests two kinds of gain setting methods: in the first method the gain is set at a single value and commonly applied to every pixel while a frame of image is being read out from the pixels, whereas in the second method, different gain values are determined for different subareas of one image frame, such as a central area and a peripheral area, according to variable doses measured in the respective subareas.

In the first method applying the same gain to all pixels in one image frame, the gain is determined by the total amount of radiation dose on the entire imaging area. In that case, if the total dose is the same, it is impossible to discriminate between a high-contrast image, which contains high density areas and low density areas with great density differences, and a low-contrast image having intermediate densities in the whole area. Accordingly, if the total dose is the same, the same gain will be applied to these images regardless of whether the contrast in the individual image is high or low. As a result, it sometimes happens that the subsequent image does not adequately reproduce the density gradation.

On the other hand, according to the second method of the prior art, applied gain may differ from one subarea to another within an image frame according to the respective densities of the subareas. Therefore, tone reproduction of the subsequent image will be improved as compared to the first method. However, as described in the prior art (in paragraph 0116), the second method needs compensation process for the differentiated gains between the subareas of the image frame in addition to other image rendering or correcting processes after the A/D conversion, such as offset correction and sensitivity correction. Therefore, the second method will complicate the image correcting processes after the A/D conversion.

SUMMARY OF THE INVENTION

I view of the foregoing, an object of the present invention is to provide a solution for acquiring high-quality radiographic images with properly reproduced density gradations without complicating the processing for image correction after the A/D conversion.

A radiographic image detector in accordance with the present invention comprises a detection panel, a signal processing circuit, a dose profile measuring device, and a gain setting device.

The detection panel has pixels arrayed in a two-dimensional matrix in an imaging area exposed to the radioactive rays, each of the pixels accumulating signal charges corresponding to the dosed amount of radioactive rays on each pixel, switching elements turned off to accumulate the signal charges in the pixels or turned on to read out the signal charges from the pixels, and wiring lines conducting electric currents corresponding to the dosed amounts of radioactive rays on the pixels, each of the wiring lines being respectively connected to a line or a column of the pixels. The signal processing circuit includes a voltage output circuit and an analog-to-digital converter. The voltage output circuit converting the signal charges read out from the pixels to a voltage signal while amplifying the voltage signal, and the analog-to-digital converter converting the voltage signal to digital data at an output of the voltage output circuit.

According to the present invention, the dose profile measuring device measures a dose profile, representative of at least linear distribution of the dosed amounts of radioactive rays within the imaging area, by the currents flowing through the wiring lines while the switching elements are off and the signal charges are accumulated in the pixels. Depending on the degree of contrast in the dose profile, the gain setting device determines and sets a gain of amplifying the voltage signal in the voltage output circuit.

Preferably, the gain setting device sets the gain the higher as the contrast in the dose profile becomes the lower.

Preferably, the contrast in the dose profile is a difference between a maximum value and a minimum value in the dose profile.

More preferably, the gain setting device determines the gain depending on the minimum value and the contrast in the dose profile.

In one embodiment, the dose profile may be measured from a portion of the imaging area; the portion preferably corresponds to an area of interest of the subject. Then, the gain may be determined properly according to the density of the area of interest.

In one embodiment, the wiring lines may be signal lines for reading out the signal charges from the pixels, each of the signal lines being respectively connected to a column of the pixels. Then the dose profile measuring device may preferably measure the dose profile by leak currents leaking from the pixels to the signal lines while the switching elements are off.

Preferably, the signal lines are respectively connected to the voltage output circuit, and the dose profile measuring device reads a leak voltage that the voltage output circuit outputs corresponding to the leak currents while the switching elements are off, to measure the dose profile.

Preferably, the gain setting device sets the gain of the voltage output circuit at a maximum level while the dose profile measuring device is reading the leak voltage.

In one embodiment, the dose profile measuring device may detect the leak currents to measure the dose profile as linear distribution of the dosed amounts in the line direction of the pixels in the matrix.

In another embodiment, the dose profile measuring device may measure the dose profile two-dimensionally making use of time lags in detection time of the leak currents from one line of the pixels to another after the start of radiation.

Preferably, the dose profile measuring device starts measuring the dose profile after the end of radiation.

In an alternative embodiment, the wiring lines may be bias lines for applying a bias voltage to the pixels, and the dose profile measuring device measures the dose profile by bias currents flowing through the bias lines while the switching elements are off.

The present invention also provides a gain setting method for a radiographic image detector, which comprises an imaging area having pixels arrayed in a two-dimensional matrix for accumulating signal charges corresponding to the dosed amount of radioactive rays on each pixel, switching elements turned off to accumulate the signal charges in the pixels or turned on to read out the signal charges from the pixels, wiring lines connected to the pixels and conducting currents corresponding to the signal charges accumulated in the pixels, a voltage output circuit for converting the signal charges readout from the pixels to a voltage signal while amplifying the voltage signal, and an analog-to-digital converter for converting the voltage signal to digital data.

The gain setting method of the present invention comprises the steps of: detecting the currents flowing through wiring lines while the switching elements are off and the signal charges are accumulated in the pixels; measuring a dose profile representative of at least linear distribution of the dosed amounts of radioactive rays within the imaging area; detecting contrast in the dose profile; determining a gain of amplifying the voltage signal in the voltage output circuit depending on the contrast; and setting the voltage output circuit at the determined gain.

According to the present invention, after a radiation dose, before reading the signal charges, a dose profile representative of at least linear distribution of the dosed amounts of radioactive rays is measured to determine the gain based on the contrast in the dose profile. Then the signal charges are read out from the pixels at the determined gain. Thus, high-quality radiographic images may be acquired with properly reproduced density gradations without complicating the image processing after the A/D conversion.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
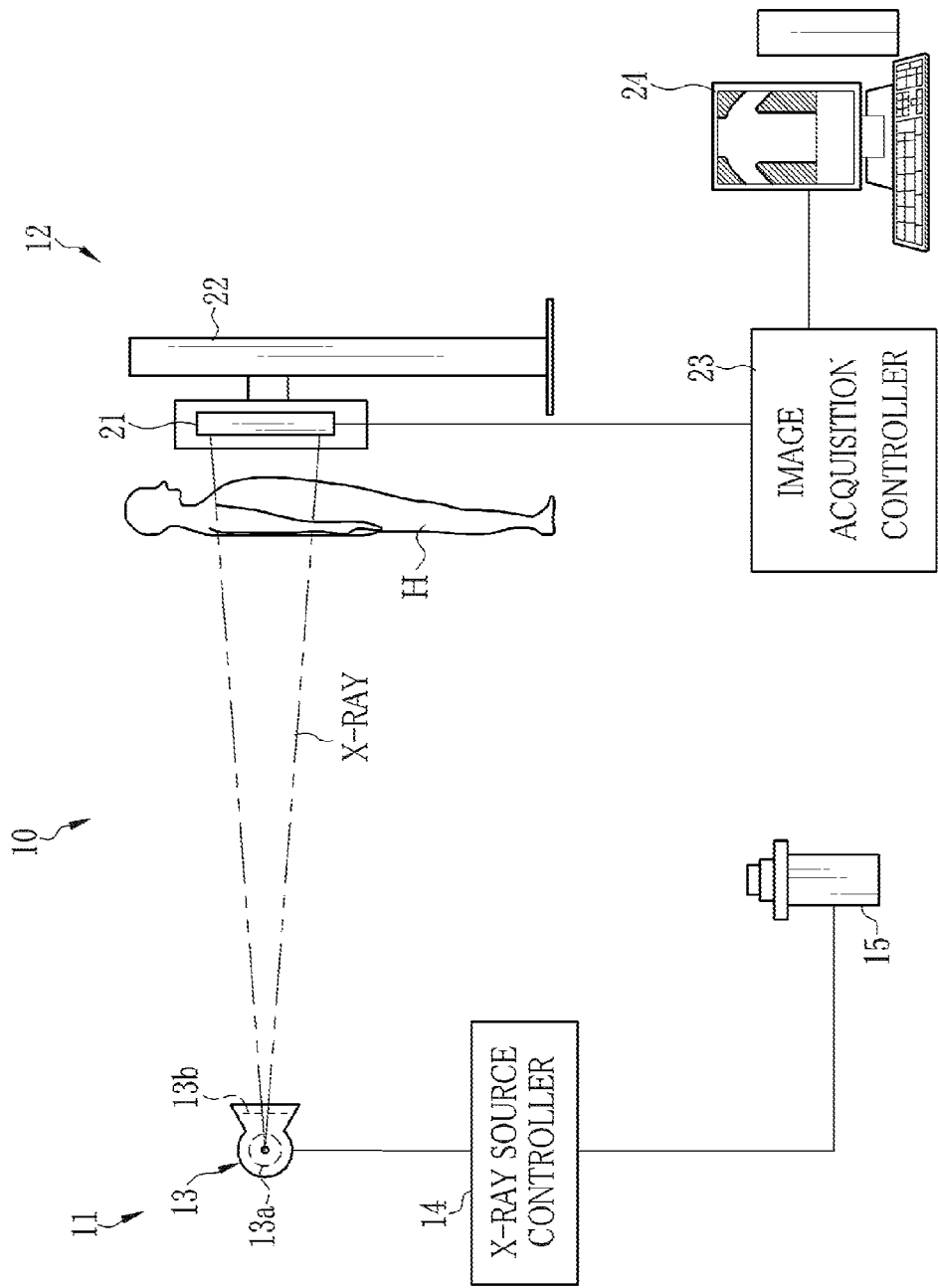
FIG. 1 is a diagram schematically illustrating an x-ray radiography system.

In FIG. 1, an x-ray radiography system 10 consists of an x-ray projector 11 and radiographic equipment 12. The x-ray projector 11 consists of an x-ray source 13, an x-ray source controller 14 for controlling the x-ray source 13, and an activator switch 15. The x-ray source 13 has an x-ray tube 13a for radiating x-rays and a collimator 13b for limiting the radiation field of x-rays from the x-ray tube 13a.

The x-ray tube 13a has a cathode which includes a filament for emitting thermions and an anode (target) against which the thermions strike to radiate x-rays. The collimator 13b may for example be made of lead plates shielding x-rays, which are put together in a double-cross formation to form a center aperture for letting x-rays pass through it. The lead plates are movable to change the size of the center aperture so as to limit the radiation field to a suitable range.

The x-ray source controller 14 includes a high voltage generator for supplying a high voltage to the x-ray source 13, and a controller for controlling tube voltage, tube current and x-ray radiation time, wherein the tube voltage determines energy spectra of x-rays from the x-ray source 13, and the tube current determines the amount of radiation per unit time. The high voltage generator generates the high tube voltage by boosting an input voltage through a transducer, and supplies the tube voltage as the driving power to the x-ray source 13 through a high voltage cable. Imaging conditions or acquisition settings, such as tube voltage, tube current and x-ray radiation time, may be manually set by a radiologist or operator using an operation panel of the x-ray source controller 14, or may be decided by instructions from the radiographic equipment 12 through a communication cable.

The activator switch 15 is operated by the radiologist, and is connected to the x-ray source controller 14 through a signal cable. The activator switch 15 may be a two-step push button switch that outputs a warm-up start signal for staring warming up the x-ray source 13 upon being pushed to the first step, and then outputs a radiation start signal upon being pushed further to the second step, letting the x-ray source 13 start radiations. These signals are fed through the signal cable to the x-ray source controller 14.

The x-ray source controller 14 controls the operation of the x-ray source 13 according to the control signals from the activator switch 15. Upon receipt of the radiation start signal from the activator switch 15, the x-ray source controller 14 starts supplying the power to the x-ray source 13 and also activates a timer to start measuring the duration of the x-ray radiation. When a radiation time given as one of exposure conditions is over, the x-ray source controller 14 stops the radiation from the x-ray source 13. The x-ray radiation time varies depending upon other exposure conditions, but the maximum x-ray radiation time for acquisition of a still image is mostly set in the range of about 500 msec. to about 2 sec. Therefore, the radiation time is limited at most to the maximum radiation time.

The radiographic equipment 12 consists of an electronic cassette 21, a radiographic stand 22, an image acquisition controller 23 and a console 24. The electronic cassette 21 mainly consists of a flat panel detector (FPD) 36 (see FIG. 2) and a housing containing the FPD 36. The electronic cassette 21 is a portable x-ray image detector that receives x-rays from the x-ray source 13 that penetrate through a test subject or patient H, to detect an x-ray image or radiograph of the test subject H. The housing of the electronic cassette 21 has a flat planer body having substantially rectangular top and bottom surfaces. The plane size of the electronic cassette 21 is about the same as those of radiographic film cassettes and IP cassettes.

The radiographic stand 22 has a slot for detachably attaching the electronic cassette 21 and holding the cassette 21 in a position where an x-ray sensitive surface thereof is opposed to the x-ray source 13. Having the same size as the film cassettes and IP cassettes, the electronic cassette 21 can be mounted to those radiographic stands or tables which are adapted to the film cassettes or IP cassettes. It is to be noted that the radiography system 10 may also use a radiographic table for imaging the test subject H in the recumbent position in place of the radiographic stand 22 for imaging the test subject H in the upright position.

The image acquisition controller 23 is communicably connected to the electronic cassette 21 through wired or wireless communication devices, to control the electronic cassette 21. Specifically, the image acquisition controller 23 sends data of acquisition settings to the electronic cassette 21 to set up conditions for signal processing in the FPD 36, and receives a synchronizing signal from the x-ray projector 11 and transfers the signal to the electronic cassette 21, thereby to synchronize the FPD 36 with the x-ray source 13. The image acquisition controller 23 also receives image data output from the electronic cassette 21 and transmits the image data to the console 24.

The console 24 may receive examination orders, each including information on the sex and age of the patient, the target site of imaging, the purpose of imaging, etc., and display the received examination orders. The examination orders may be issued by external systems, such as a hospital information system (HIS) and a radiological information system (RIS), which manage information on patients and information on x-ray examinations. The examination orders may also be manually input by the operator or radiologist. Before executing the imaging, the radiologist inputs acquisition settings in the console 24 with reference to the contents of the designated examination order.

The console 24 transmits data of the input acquisition settings to the image acquisition controller 23 and receives radiographic data of x-ray images from the image acquisition controller 23. The console 24 processes the radiographic data for various image renderings, such as gamma correction and frequency enhancement. Based on the processed image data, x-ray images are displayed on a screen of the console 24. The processed radiographic image is also stored in a data storage device, such as a hard disc in the console 24 or an image database server that is communicably connected to the console 24 through a network.

Figure 2:
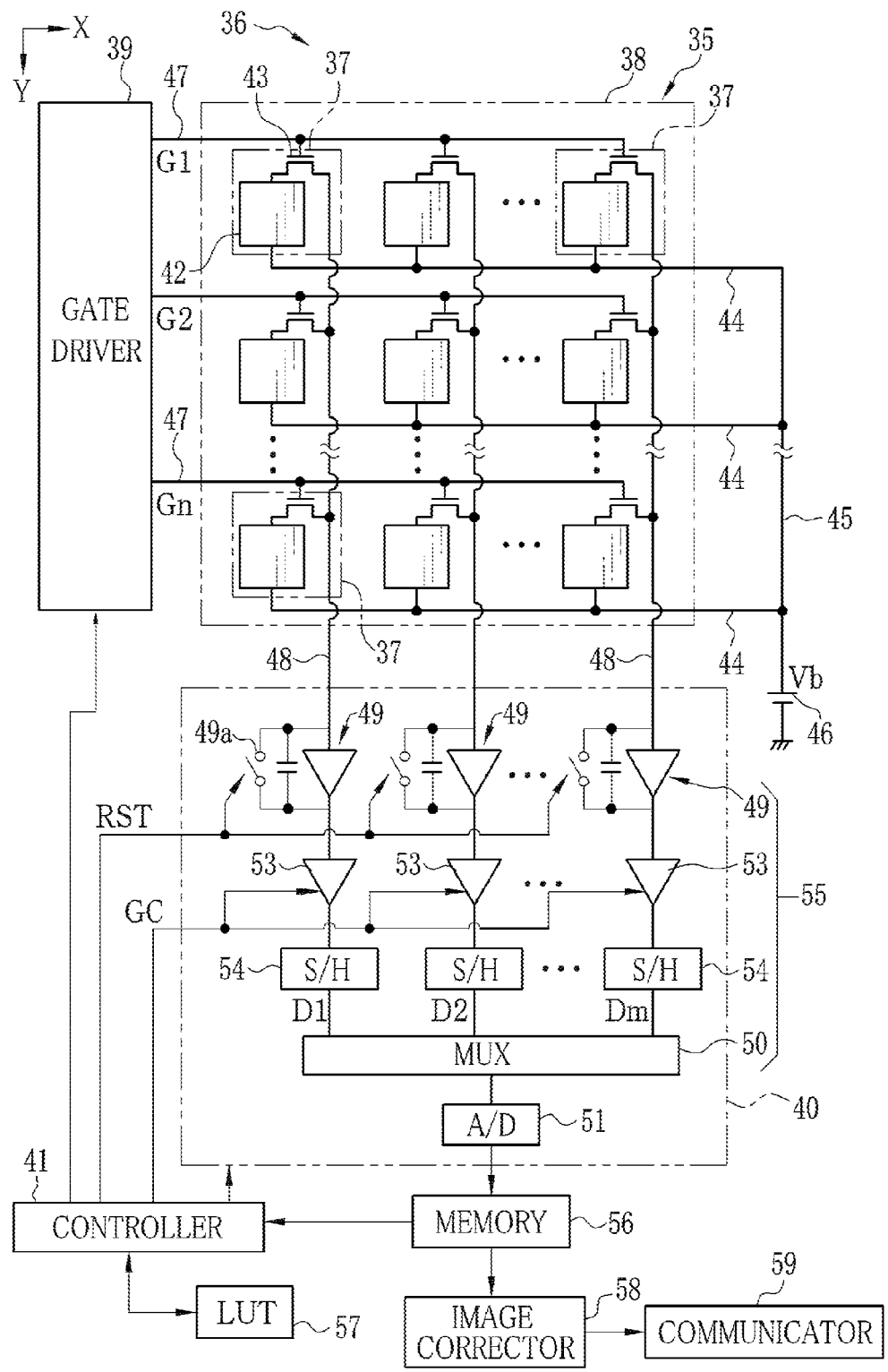
FIG. 2 is a circuit diagram illustrating an electric structure of a flat panel detector.

Referring to FIG. 2, the FPD 36 includes a detection panel 35, a gate driver 39, a signal processing circuit 40, and a control circuit 41. The detection panel 35 has a thin film transistor (TFT) active matrix substrate having an imaging area 38 formed thereon, in which pixels 37 for accumulating signal charges according to the incident amount of x-rays are arranged in a matrix (n-lines and m-columns) at predetermined intervals; the line direction and the column direction of the pixel matrix correspond to x-direction and y-direction of the imaging area 38, respectively. The gate driver 39 drives the pixels 37 to control reading of the signal charges. The signal processing circuit 40 converts the signal charges, as read from the pixels 37, to digital data and outputs the digital data. The control circuit 41 controls the gate driver 39 and the signal processing circuit 40 to control the operation of the FPD 36.

The FPD 36 may be of an indirect conversion type that has a not-shown scintillator for converting x-rays to visible rays and converts the visible rays to electric charges through the pixels 37. The scintillator is positioned to face to the whole imaging area 38. The scintillator is made of a phosphor such as cesium iodide (CsI) or gadolinium oxy sulfide (GOS). Note that the FPD 36 may be replaced with a direct conversion type flat panel detector using a conversion layer that converts x-rays directly to electric charges; the conversion layer may be made of amorphous selenium.

Each of the pixels 37 includes a photodiode 42, a not-shown capacitor, and a thin film transistor (TFT) 43. The photo diode 42 is a photoelectric conversion element that generates charges (pairs of electrons and holes) when the visible rays enter. The capacitor accumulates the charges generated from the photo diodes 42, and the TFT 43 serves as a switching element.

The photo diode 42 has a semiconductor layer, e.g. PIN-type amorphous silicon (a-Si) layer, and electrodes are provided on the top and bottom of the semiconductor layer. The photo diode 42 is connected at the lower electrode to the TFT 43 and at the upper electrode to a bias line 44.

The bias lines 44 are provided one for each line of the pixels 37 in the imaging area 38; one bias line 44 is connected to every pixel 37 of the corresponding line. The bias lines 44 are interconnected through a connection line 45, which leads to a bias power source 46. Thus, through the connection line 45 and the bias line 44, a bias voltage Vb is applied from the bias power source 46 to the upper electrodes of the photodiodes 42. The applied bias voltage Vb induces an electric field in the semiconductor layer of each pixel, causing the electrons in the semiconductor layer to move to the upper electrode of positive polarity, and the holes in the semiconductor layer to the lower electrode of negative polarity. As a result, charges are accumulated in the capacitors.

Each of the TFTs 43 is connected at its gate to a scanning line 47, at its source to a signal line 48, and at its drain to the photodiode 42. The scanning lines 47 and the signal lines 48 are interconnected into a grid. The scanning lines 47 are provided corresponding to the pixel lines (n-lines) of the imaging area 38 such that one scanning line 47 is connected to every pixel 37 of the corresponding pixel line. The signal lines 48 are provided corresponding to the pixel columns (m-columns) of the imaging area 38 such that one signal line 48 is connected to every pixel 37 of the corresponding column. The scanning lines 47 are respectively connected to the gate driver 39, whereas the signal lines 48 are respectively connected to the signal processing circuit 40.

The gate driver 39 drives the TFTs 43 to make an accumulating operation for accumulating the signal charges in the pixels 37, a reading operation for reading out the signal charges from the pixels 37, or a resetting operation for resetting the signal charges accumulated in the pixels 37. The control circuit 41 controls the timings when the gate driver 39 starts the above operations.

The accumulating operation is carried out by turning off the TFTs 43, and the signal charges are accumulated in the pixels 37. In the reading operation, the gate driver 39 sequentially outputs gate pulses G1 to Gn, one gate pulse to one scanning line 47, activating the pixel lines one after another, to drive the TFTs 43 of the activated line all at once. Thus, the TFTs 43 are turned on line by line.

When the TFTs 43 of one line are turned on, the signal charges accumulated in the pixels 37 of this line are fed through the respective signal lines 48 to the signal processing circuit 40. The signal charges of one line are converted to voltages through a voltage output circuit 55 in the signal processing circuit 40, as set forth in detail later. Output voltages corresponding to the respective signal charges are read out as analog voltage signals D1 to Dm. The analog voltage signals D1 to Dm are converted to digital image data that shows digital pixel levels representative of density levels of the respective pixels of one line. The image data is fed to a memory 56 that is built in the housing of the electronic cassette 21.

As well known in the art, dark currents will be generated in the semiconductor layers of the photo diodes 42 regardless of whether the photo diodes 42 are exposed to x-rays or not. While the bias voltage is being applied, dark charges corresponding to the dark currents are accumulated in the capacitors. Because the dark charges are noises for the image data, the resetting operation is carried out to sweep off the dark charges from the pixels 37 through the signal lines 48.

The resetting operation may be executed for example in a line-sequential method resetting the pixels 39 line by line. According to the line-sequential resetting method, the gate driver 39 sequentially outputs the gate pulses G1 to Gn to the respective scanning lines 47, like in the reading operation, to turn on the TFTs 43 line by line. As the TFTs 42 are turned on, the dark charges accumulated in the pixels 37 are discharged through the signal lines 48 to the signal processing circuit 40.

Unlike the reading operation, the signal processing circuit 40 does not output any voltage signal in the resetting operation. Instead, the control circuit 41 outputs a reset pulse RST to the signal processing circuit 40 synchronously with each gate pulse G1 to Gn from the gate driver 39 in the resetting operation. The reset pulse RST turns on reset switches 49a of integrating amplifiers 49 of the signal processing circuit 40, resetting the input dark charges in the signal processing circuit 40, as set forth in detail below.

Alternatively, the resetting operation may be carried out in another method, such as a parallel resetting method or a total resetting method. In the parallel resetting method, the dark charges are swept out from several pixel lines in parallel to each other. In the total resetting method, the dark charges are swept out from all pixels at once. Therefore, the parallel setting method and the total resetting method will accelerate the resetting operation.

The signal processing circuit 40 includes the integrating amplifiers 49, a multiplexer (MUX) 50, amplifiers 53, sampling and holding (S/H) circuits 54, and an A/D converter 51. The integrating amplifiers 49 are connected to the signal lines 48 in one-to-one relationship. Each integrating amplifier 49 consists of an operational amplifier and a capacitor connected between an input and an output of the operational amplifier. The signal line 48 is connected to the input of the operational amplifier. The operational amplifier has another not-shown input terminal that is grounded. The integrating amplifiers 49 integrate the signal charges from the signal lines 48 to convert them to the voltage signals D1 to Dm.

The amplifiers 53 are connected to the output terminals of the integrating amplifiers 49 in one-to-one relationship. The amplifiers 53 amplify the voltage signals D1 to Dm at a determined gain or amplification. For example, the amplifier 53 includes an operational amplifier that feeds back its output voltage to its input to amplify the input voltage and outputs the amplified voltage, wherein a not-shown input resistor is connected to the input of the operational amplifier and a not-shown feedback resistor is connected between the input and the output of the operational amplifier. The gain of the amplifier 53 is adjustable by changing the ratio of resistance of the input resistor to the feedback resistor. The gain of the amplifier 53 may be changed by changing the resistance of the input resistor or the resistance of the feedback resistor according to a gain control signal (GC) from the control circuit 41.

The S/H circuits 54 are connected to the respective outputs of the amplifiers 53, to hold the voltage signals D1 to Dm from the amplifiers 53 and output the held voltage signals D1 to Dm to the MUX 50, which has parallel input terminals connected to the respective S/H circuits 54. The integrating amplifiers 49, the amplifiers 53, the S/H circuits 54 and the MUX 50 constitute the voltage output circuit 55. The A/D converter 51 is connected to an output of the MUX 50.

The MUX 50 sequentially selects one of the S/H circuits 54 to input the voltage signals D1 to Dm from the S/H circuits 54 serially to the A/D converter 51.

The A/D converter 51 may for example be an 8-bit converter or 12-bit converter; the 8-bit converter has a dynamic range of 256 tonal levels, and the 12-bit converter has a dynamic range of 4096 tonal levels. The A/D converter 51 converts the analog voltage signals D1 to Dm to digital pixel levels corresponding to their signal levels with the dynamic range of the A/D converter 51. Therefore, the wider dynamic range provides the wider range of reproducible density levels. Moreover, within a certain density range, the wider dynamic range of the A/D converter 51 will provide the higher density resolution, allowing finer expression of the density gradation.

In the reading operation after the charge accumulating operation, the gate pulses G1 to Gn are generated to turn on the TFTs 43 line by line, to read the signal charges from the capacitors of the pixels 37 of the activated lines through the signal lines 48 into the voltage output circuit 55.

When the voltage output circuit 55 outputs the voltage signals D1 to Dm for one line, the control circuit 41 outputs a reset pulse or reset signal RST to the integrating amplifiers 49 to turn on the reset switches 49a of the integrating amplifiers 49. Thereby, the signal charges for one line, accumulated in the integrating amplifiers 49, are reset to zero. Upon resetting the integrating amplifiers 49, the control circuit 41 controls the gate driver 39 to output the gate pulse to the next line, starting reading the signal charges of the pixels 37 of the next line. These operations are sequentially repeated to readout the signal charges from the pixels 37 of all lines.

When the signal charges have been read out from all lines, image data of a frame of x-ray image is stored in the memory 56. The image data is then read out from the memory 56 to be output to the image acquisition controller 23 via a communication device 59. Thus the x-ray image of the test subject H is detected.

The control circuit 41 also executes a dose profile measuring operation for measuring a dose profile representative of distribution of the dosed amounts of x-rays within the imaging area 38, which is used for deciding the gain of the amplifiers 53 in the reading operation. The control circuit 41 determines the gain depending on the contrast in the measured dose profile, and sends the gain control signal GC to the amplifiers 53 to set the amplifiers 53 at the determined gain. The same gain is used for reading an image frame, and is applied to every pixel 37 of the imaging area 38 in one cycle of the reading operation. Thus, the control circuit 41 constitutes the dose profile measuring device and the gain setting device of the present invention.

In one embodiment, the dose profile may represent the distribution of the dosed amounts of x-rays in the line direction of the pixel matrix or x-direction of the imaging area 38, which corresponds to a density profile representative of density distribution of the x-ray image of the test subject H in the line direction of the image frame. As shown in FIG. 2, the signal lines 48 extend in the y-direction and a column of pixels 37 are aligned along and connected to each signal line 48. Accordingly, the dose profile is obtained by plotting the total dose of x-rays on the pixels 37 of one column after another.

Figure 3:
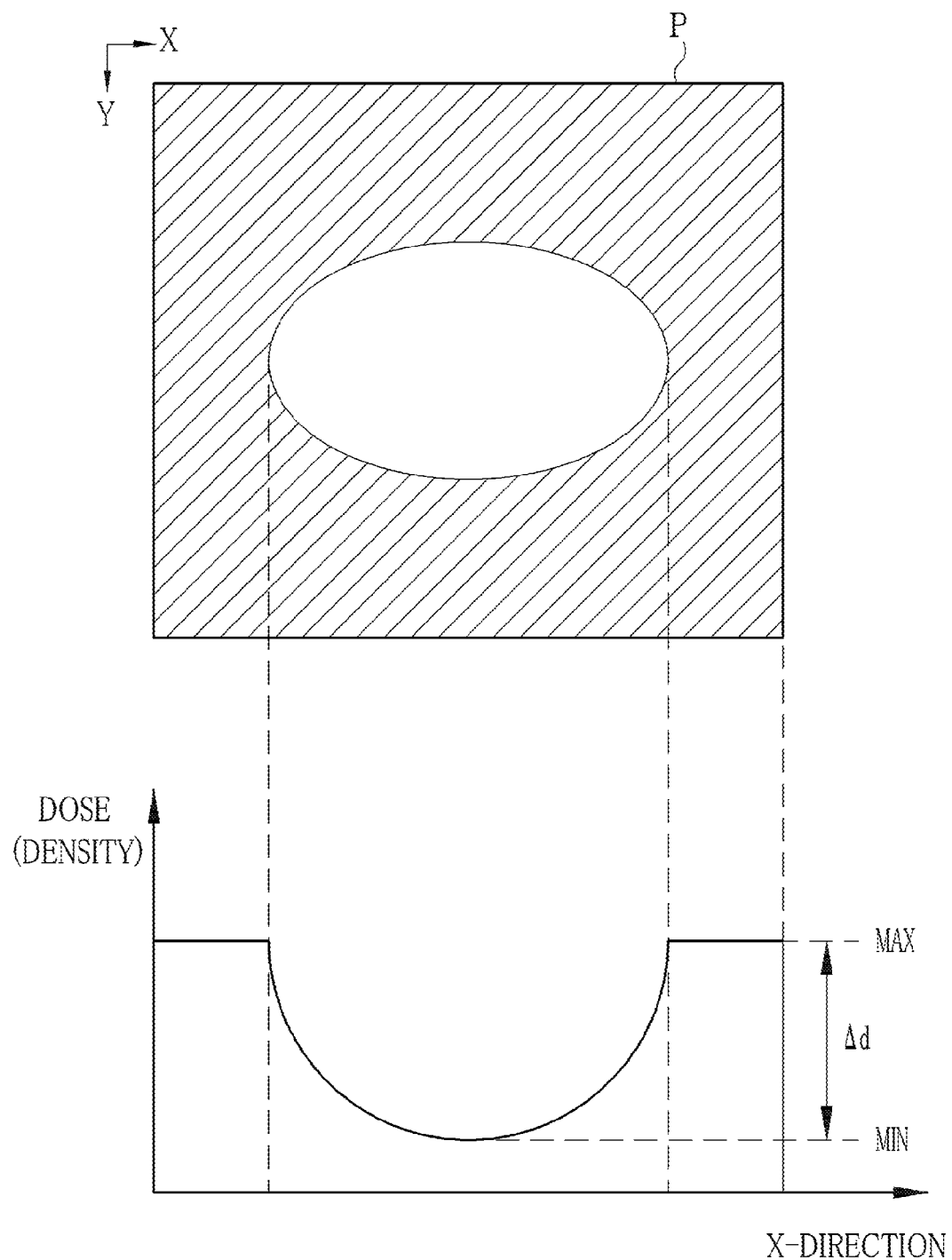
FIG. 3 is an explanatory diagram illustrating a dose profile.

Referring to FIG. 3, an example of the dose profile will be described in relation to an x-ray image P that is acquired from a subject of a simple structure with an oval shape, instead of a test subject like a human body, for the sake of simplifying the explanation. The interior of the subject is assumed to have a uniform x-ray attenuation coefficient and hence the x-ray transmittance or radiolucency is constant in the entire area of the subject. In the x-ray image P, a hatched area around the subject image represents a directly-exposed area dosed fully with the x-rays without being attenuated by the subject.

Concerning this x-ray image P, the does profile along the x-direction may be as shown in the graph underneath the image P. In this dose profile, the density corresponds to the total or cumulative radiation dose on each column of pixels, and the density has the maximum value (MAX) in either terminal range of the profile, because these terminal ranges entirely correspond to the directly-exposed area where the pixels 37 are exposed to the x-rays without attenuation. In the range corresponding to the oval subject, the fraction of directly-exposed area decreases and gets to the minimum at a point corresponding to the center of the oval subject. Correspondingly, the density or the cumulative radiation dose on each column of pixels decreases from the terminal ranges toward the center of the oval subject and gets to the minimum (MIN) at the point corresponding to the center of the oval subject.

The control circuit 41 first eliminates abnormal values, e.g. a pixel level of a defective pixel, from the measured dose profile. Thereafter the control circuit 41 calculates a contrast value from a difference $\Delta d$ between the maximum density (MAX) and the minimum density (MIN) of the dose profile. Then the control circuit 41 decides the gain according to the calculated contrast value.

Figure 4:
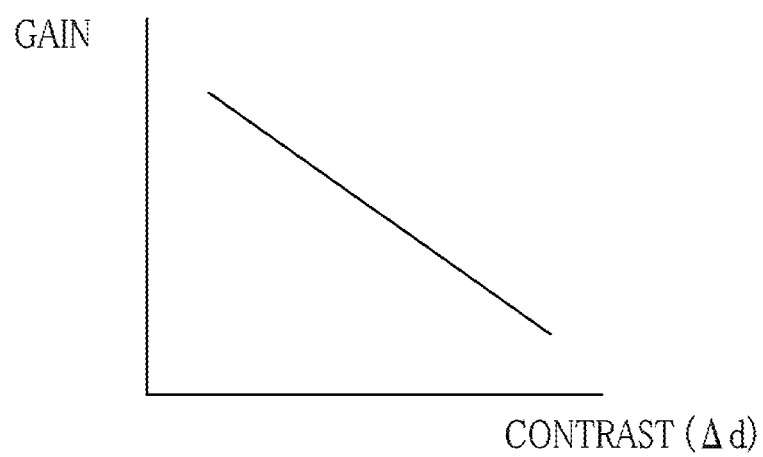
FIG. 4 is an explanatory diagram illustrating a look-up table for deciding the gain.

As shown in the graph of FIG. 4, the control circuit 41 sets the gain smaller the higher the contrast becomes. Referring back to FIG. 2, the control circuit 41 is connected to a look up table (LUT) 57 storing table data that indicates such a correlation between the contrast and the gain as indicated by the graph of FIG. 4. The control circuit 41 determines the gain to be a value readout from the LUT 57 in accordance with the calculated contrast. It is appreciated that the gain may also be determined by calculation using an equation expressing the correlation between the contrast and the gain.

Figure 5A:
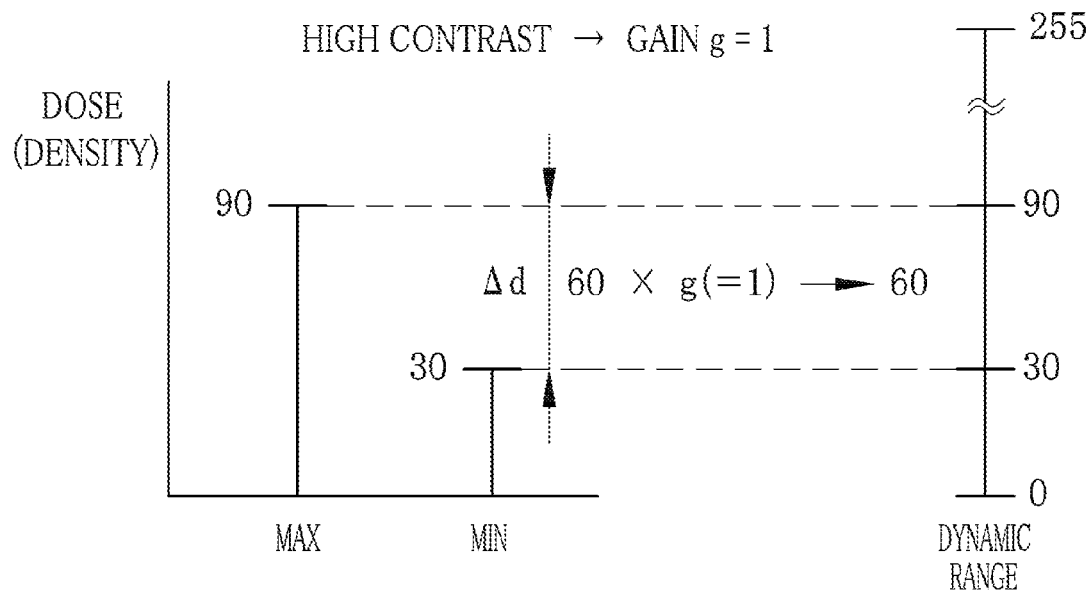
FIGS. 5A and 5B are explanatory diagrams illustrating how the gain is determined depending on the contrast.

In one embodiment shown in FIG. 5A, if the contrast is relatively high, for example, the maximum density is "90", the minimum density is "30" and the difference $\Delta d$ is "60" in the dose profile, the gain "g" is decided to be a small value, e.g. "1". Where the gain "g" is "1", the maximum density will be "90", the minimum density will be "30", and the difference $\Delta d$ will be "60". The contrast does not change from before being multiplied by the gain.

Note that the A/D converter 51 is assumed to have 8-bit dynamic range (256 tonal levels) in the embodiment of FIG. 5. Although the density values of the dose profile are multiplied by the gain in FIG. 5, this is for the convenience of explanation. The gain should actually be used for multiplying the voltage signal D representative of the density of each pixel 37.

Figure 5B:
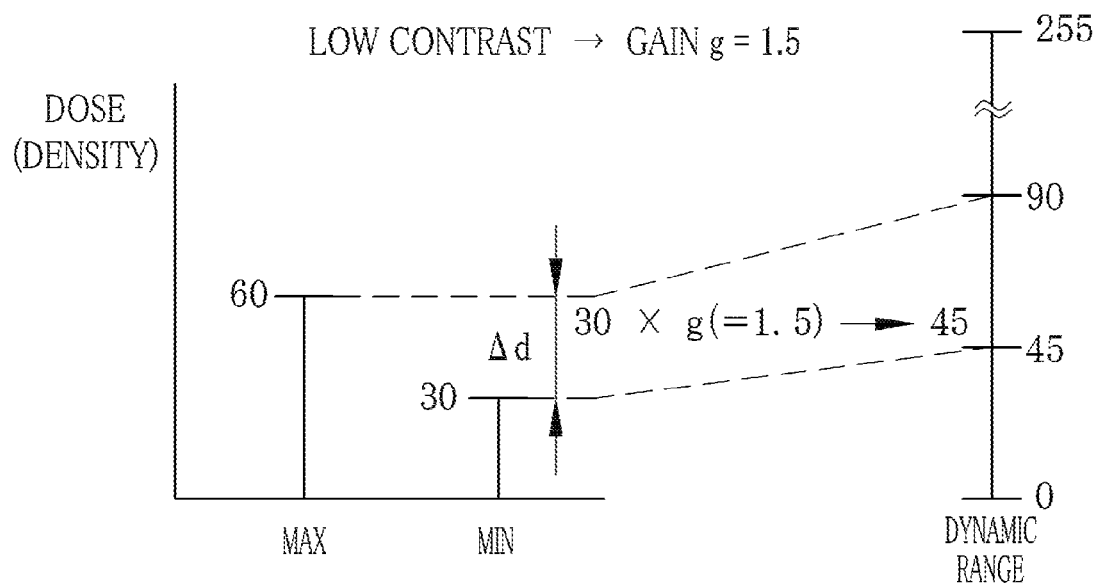

On the other hand, if the contrast is relatively low, as shown for example in FIG. 5B, the maximum density is "60", the minimum density is "30" and the difference $\Delta d$ is "30" in the dose profile, the gain "g" is decided to be a larger value, e.g. "1.5". By setting the gain "g" at "1.5", the maximum density will be "60·1.5=90" and the minimum density will be "30·1.5=45", so the difference $\Delta d$ will increase from "30" to "45".

Thus, when the contrast in the dose profile is low, i.e. the difference between the maximum density and the minimum density, is small, the gain is set to enhance the differences between the pixel levels corresponding to the voltage signals D of the pixels 37, making good use of the dynamic range of the A/D converter 51, in order to achieve finer tone reproduction using the wider dynamic range. On the other hand, when the contrast in the dose profile is high, the gain for the voltage signal D is set at a small value to avoid the risk that the voltage signal D of the high density range is so amplified that it goes beyond the dynamic range of the A/D converter 51.

Indeed the above-mentioned dose profile is linear, but it reflects the contrast in the x-ray image. Therefore, adjusting the gain depending on the contrast in the dose profile permits acquiring x-ray images that reproduce the density gradation adequately according to the density range of the image.

Now the operation of the FPD 36, including the dose profile measuring operation, will be described with reference to FIG. 6.

After being set to the imaging conditions corresponding to the acquisition settings designated by the image acquisition controller 23, the gate driver 39 outputs the gate pulses G1 to Gn to the respective scanning lines 47 to repeat the resetting operation till the x-ray projector 11 starts the radiation. When the activation switch 15 is operated, the x-ray projector 11 starts projecting x-rays and sends a radiation start signal to the FPD 36. In response to the radiation start signal, the control circuit 41 turns off the TFTs 43 of all pixels 37 to start the accumulating operation. Specifically, the FPD 36 switches from the resetting operation to the accumulating operation when the resetting operation for the current image frame is completed by resetting the charges on the last pixel line with the gate pulse Gn that is generated after the FPD 36 receives the radiation start signal.

The dose profile measuring operation may be executed for a period after the start of x-ray radiation from the x-ray source 13 till the start of reading operation for reading the accumulated signal charges. In the present embodiment, the dose profile measuring operation is started immediately after the end of x-ray radiation. The control circuit 41 starts measuring the x-ray radiation time from the start of x-ray radiation using a built-in timer, to detect the end of radiation when the x-ray radiation time is over.

When the x-ray radiation stops, the control circuit 41 measures the dose profile by detecting leak currents that leak from the pixels 37 to the signal lines 48 while keeping the TFTs 43 off. The leak current increases in proportion to the signal charge CP accumulated in each pixel 37, namely, the radiation dose on each pixel 37.

Figure 6:
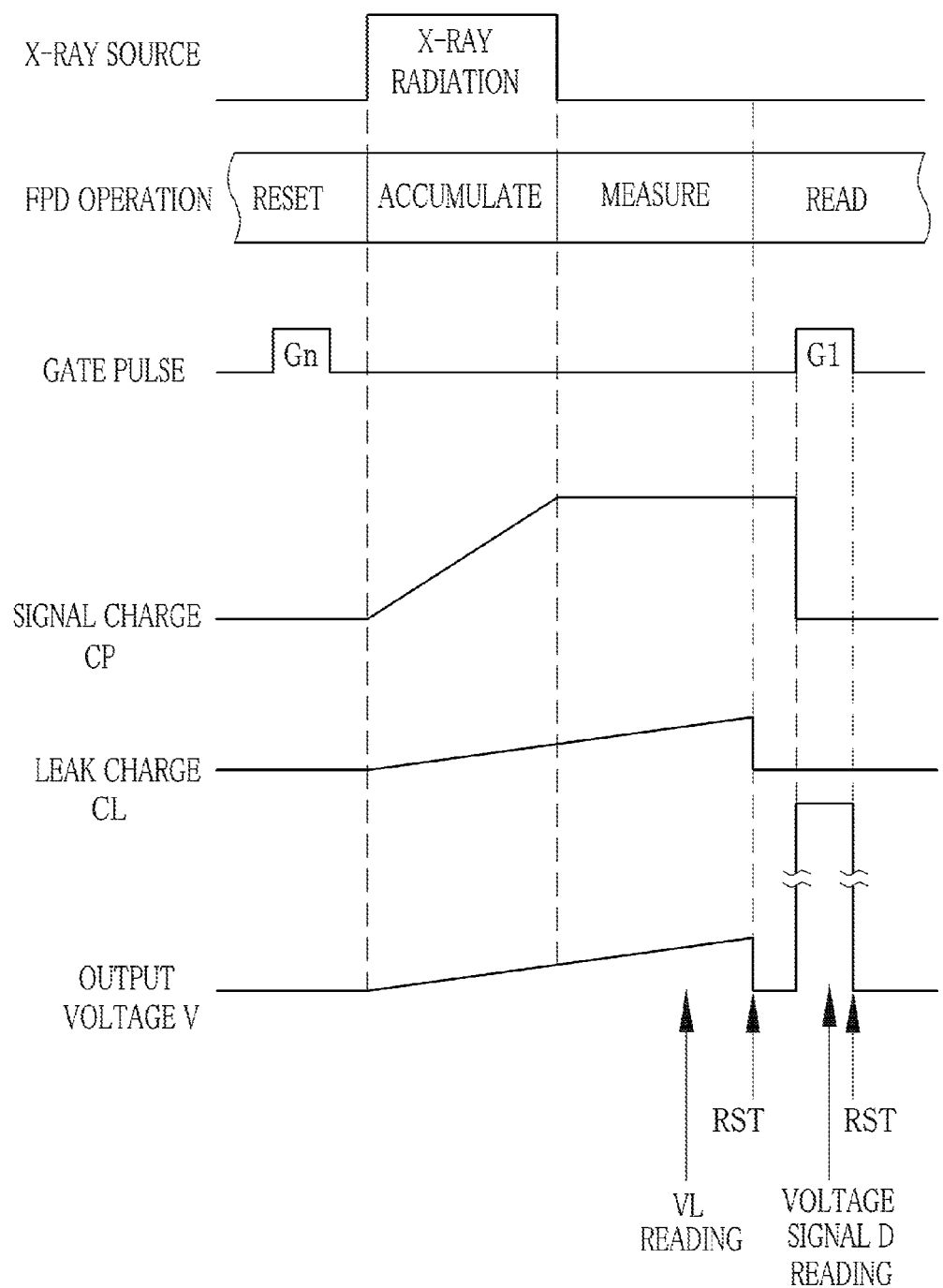
FIG. 6 is a timing chart illustrating a dose profile measuring operation.

In FIG. 6, an output voltage V of one of the integrating amplifiers 49 is illustrated. When the leak currents from those pixels 37 which are connected to one signal line 48 flow into the corresponding amplifier 49, the amplifier 49 accumulates a leak charge CL as a cumulative value of the leak currents and outputs a leak voltage VL corresponding to the leak charge CL as the output voltage V.

When the x-ray radiation starts, the signal charges CP accumulated in the pixels 37 increase with the incident amounts of x-rays on the pixels 37. As the signal charges CP are accumulated, parts of the signal charges CP leak to the signal lines 48 through the TFTs 43 even in the OFF position, resulting in the leak currents. With the leak currents through the signal lines 48, the leak charges CL accumulated in the integrating amplifiers 49 increase, boosting up the leak voltages VL at the outputs of the integrating amplifiers 49.

As shown in FIG. 6, the leak charge CL still increases even after the x-ray radiation stops and hence the signal charge CP stops increasing. This is because the leak charge CL accumulated in one integrating amplifier 49 is a cumulative value of those leak charges which leak out from the pixels 37 of one column, which are connected to the one amplifier 49 through one signal line 48. According to the difference in distance to the integrating amplifier 49, the leak charges from the respective pixels 37 get to the integrating amplifier 49 at different times. That is, the leak charge from the nearer pixel 37 gets to the integrating amplifier 49 the faster. Therefore, the leak charges from pixels 37 far from the integrating amplifier 49 can get to the integrating amplifier 49 after the signal charges CP in the pixels 37 stop increasing, which increase the leak charge CL in the integrating amplifier 49 even after the end of increase in the signal charge CP.

It is to be noted that the curve of the leak charge CL is magnified for the convenience of explanation. Actually, the leak charge CL is very small compared to the signal charge CP.

The control circuit 41 outputs a command to the signal processing circuit 40 to read out the leak voltage VL at a predetermined timing after the end of x-ray radiation. Specifically, the timing of reading out the leak voltage VL is determined taking account of the time lag from the end of x-ray radiation till the leak charge from the farthest pixel 37 gets to the integrating amplifier 49.

The MUX 50 sequentially selects one integrating amplifier 49 after another to read out the leak voltage VL from the selected integrating amplifier 49. The leak voltage VL is converted through the A/D converter 51 to a digital value, which is stored in the memory 56. The control circuit 41 reads out the digital values of the leak voltages VL from the memory 56 to produce the dose profile, and calculates the contrast in the dose profile. With reference to the LUT 57, the control circuit 41 decides the gain according to the calculated contrast, and then sets the amplifiers 53 at the decided gain.

Since the dose profile measuring operation is executed by detecting the leak currents from the pixels 37 while keeping the TFTs 43 off, it may be accomplished with little loss of signal charges CP from the pixels 37, namely the loss of x-rays dosed onto the subject H, in comparison with a case where the TFTs 43 are turned on in order to read out the charges from the pixels 37. Moreover, because the signal processing circuit 40 for reading out the signal charges is utilized for measuring the dose profile in the above embodiment, the cost will be saved in comparison with a case where a specific dose profile measuring circuit is adopted.

When the dose profile measuring operation is finished, the control circuit 41 outputs the reset pulse RST to reset the leak charges CL from the integrating amplifiers 49. Thereafter, the reading operation for reading the signal charges CP from the pixels 37 is executed by outputting the gate pulses G1 to Gn sequentially from the gate pulse G1 to the respective scanning lines 47. Then the TFTs 43 are turned on to transfer the signal charges CP through the signal lines 48 to the integrating amplifiers 49. Corresponding to the signal charges CP input in the integrating amplifiers 49, the output voltages V of the integrating amplifiers 49 increase. The output voltages V are read out as the voltage signals D (D1 to Dm).

Referring back to FIG. 2, an image correcting section 58 renders the image data of x-ray images, read out from the memory 56, with correction processes: offset correction for eliminating offset components which may be included in the image data because of individuality of the FPD 36 or environmental factors, and sensitivity correction for compensating for variations in sensitivity between the photo diodes 42 or variations in output characteristics of the voltage output circuit 55.

The offset correction and the sensitivity correction may be carried out using offset correction data and sensitivity correction data, respectively, which may be obtained through a calibration process that may be executed at each actuation of the electronic cassette 21 or periodically at a certain interval. The offset correction data is a frame of image data that is read out from the FPD 36 without any x-ray radiation dose. The offset correction data reflects fixed pattern noises representative of variations in dark-current characteristics between the individual pixels 37, and other noise components representative of variations in output characteristics of the voltage output circuit 55. Since the signal charges contains these noise components, the offset correction data is subtracted in pixel-to-pixel relationship from each x-ray image data as acquired from the test subject H, to eliminate the noise components from the image data.

The sensitivity correction data is a set of coefficients obtained by subtracting the offset correction data in pixel-topixel relationship from a frame of image data that is readout from the FPD 36 as it is exposed to x-rays while no subject H is positioned. The sensitivity correction data reflects the variations in sensitivity between the pixels 37. After the offset correction, the x-ray image is multiplied by the sensitivity correction data in pixel-to-pixel relationship, correcting density variations in the image that may be caused by the sensitivity variations between the pixels 37.

After going through the image correction, the x-ray image is transmitted from the communicator 59 to the image acquisition controller 23 and then to the console 24.

Figure 7:
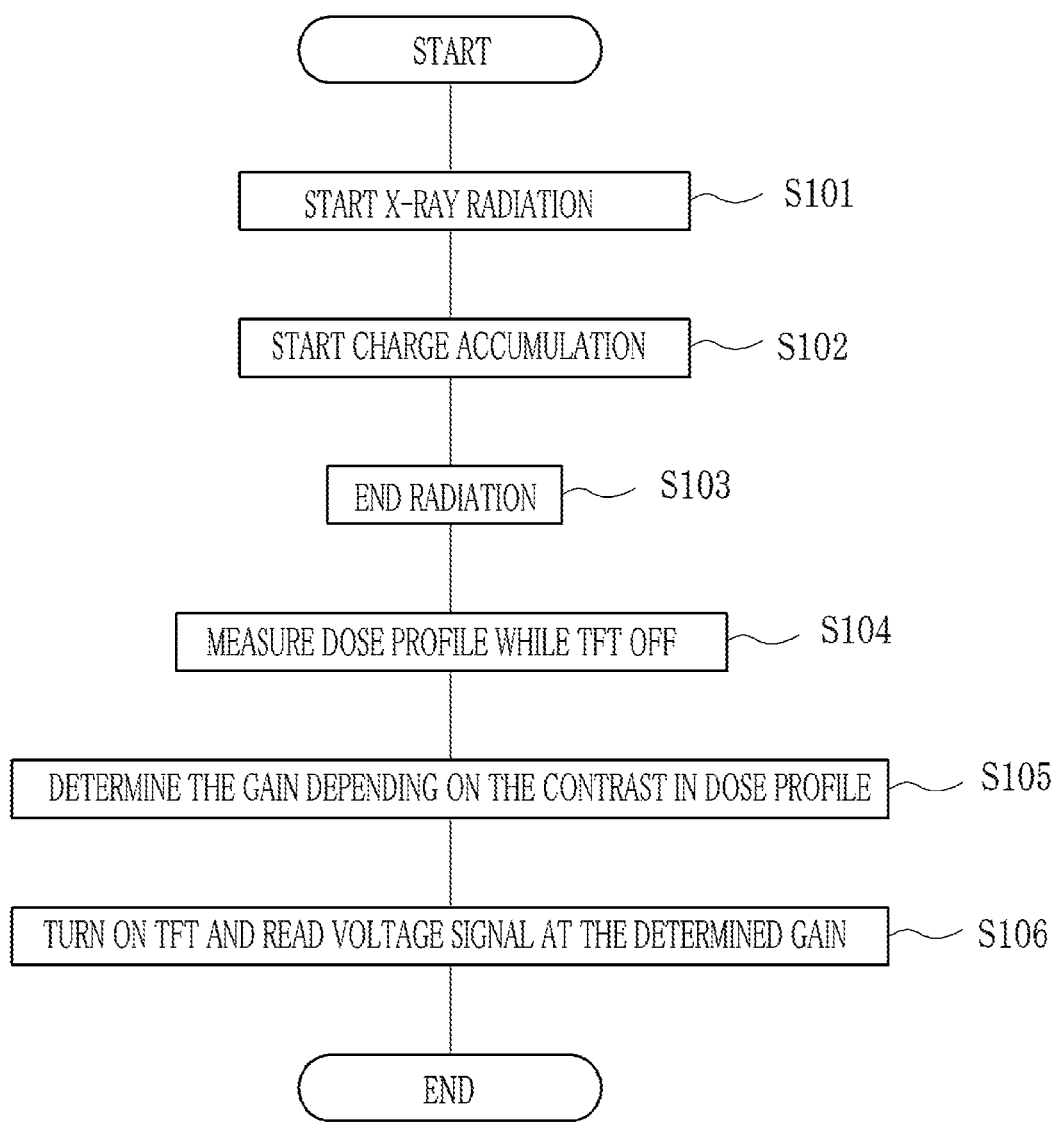
FIG. 7 is a flowchart illustrating the procedure for determining the gain.

The overall operation of the x-ray radiography system 10 configured as above will be described with reference to the flowchart of FIG. 7. To start image acquisition of a subject H, preparatory operations for imaging, such as positioning of the electronic cassette 21 relative to a target site of the subject H by adjusting the height of the electronic cassette 21 as mounted in the radiographic stand 22, and setting of exposure conditions, are carried out. Thereafter, the FPD 36 of the electronic cassette 21 starts the resetting operation.

When the activation switch 15 is turned on after the preparatory operations, the x-ray source controller 14 sends a warm-up start signal and a radiation start signal to the x-ray source 13. Upon receipt of the radiation start signal, the x-ray source 13 starts x-ray radiation (S101). The x-ray source controller 14 also transmits the radiation start signal to the image acquisition controller 23, so that the image acquisition controller 23 transmits the radiation start signal to the electronic cassette 21.

Upon the radiation start signal, the control circuit 41 of the electronic cassette 21 detects the start of x-ray radiation, and stops the resetting operation to start the accumulating operation (S102). The control circuit 41 also starts measuring the duration of the x-ray radiation. When the given radiation time is over, the control circuit 41 detects the end of x-ray radiation (S103), and starts the dose profile measuring operation (S104).

In the dose profile measuring operation, the control circuit 41 reads out the leak voltages VL of the integrating amplifiers 49, connected to the respective signal lines 48, through the signal processing circuit 40 while keeping the TFTs 43 off, to measure the dose profile along the x-direction or line direction transverse to the signal lines 48 (S104). Then the control circuit 41 calculates the contrast or difference between the maximum and minimum values of the measured dose profile. With reference to the LUT 57, the control circuit 41 decides the gain depending on the contrast, and sets the gain at the amplifiers 53 (S105).

Then the control circuit 41 starts the reading operation (S106). In the reading operation, the gate driver 39 sequentially outputs the gate pulses G1 to Gm to the scanning lines 47, to read out the signal charges line by line from the pixels 37. The voltage signals D1 to Dm are amplified by the amplifiers 53 at the set gain when being output from the integrating amplifiers 49. As shown in FIGS. 4 and 5, the gain will be set to a small value when the contrast is high, or a large value when the contrast is low. This will make effective use of the dynamic range of the A/D converter 51, achieving adequate reproduction of density gradation of the image.

As the decided gain is applied to every pixel 37 of the imaging area 38, the present invention will not complicate the operations for image corrections in the image correcting section 58, such as the offset correction and the sensitivity correction of the image after the analog-to-digital conversion. Specifically, in the case where the gain can be different from one subarea to another within the imaging area, like in the second method of the above prior art, one pixel may have a different pixel level from another pixel of a different subarea because of the different gain values, even while these two pixels originally represent the same density. In that case, the offset correction and the sensitivity correction must take the gain difference into consideration. On the contrary, since the same gain is applied to all pixels 37, the present invention does not need such complicated processes for the image correction.

In the above embodiment, the dose profile used for deciding the gain is measured based on the leak currents through the signal lines 48 while the TFTs 43 are off. Accordingly, less signal charges will be lost by the dose profile measurement in comparison with a case where the TFTs 43 are turned on to read out the signal charges from the pixels 37 in order to measure the dose profile. Because the amounts of the signal charges correspond to the incident amounts of x-rays on the pixels, the present invention makes it unnecessary to increase the amount of x-ray radiation for compensating for such loss of signal charges. Therefore, the dose profile measurement according to the present invention will suppress the amount of radiation dose on the test subject H. Because the leak charges corresponding to the leak currents are so smaller than the signal charges that the time taken for reading out the leak charges and hence the time taken for measuring the dose profile will be saved in comparison with the case where the signal charges are read out to measure the dose profile.

In the above embodiment, the gain of the voltage output circuit 55 is adjusted at the amplifiers 53 depending on the contrast in the dose profile. In an alternative, the gain may be adjusted at the MUX 50.

Since the leak currents are small, it is preferable to set the gain of the voltage output circuit 55 at a maximum level for reading the leak voltage VL. Thereafter, the gain of the voltage output circuit 55 should be set at the value decided according the contrast in the dose profile.

In the above embodiment, the control circuit 41 decides the gain based only on the contrast in the dose profile. In addition to the contrast, the minimum level of the dose profile may preferably be used for deciding the gain. This is because even if the contrast is low if the minimum density level or dose level is relatively high, pixel level saturation can occur with a large gain decided only by the contrast. On the other hand, even if the contrast is high if the minimum density level or dose level is relatively low, the density gradation range may be widened using a large gain within the dynamic range.

Therefore, in the alternative embodiment, when the contrast is low but the minimum level is high, the control circuit 41 may set the gain at a lower level than decided only by the low contrast. On the other hand, when the contrast is high but the minimum level is low, the control circuit 41 may set the gain at a higher level than decided only by the high contrast.

In the above embodiment, the dose profile is measured with respect to the entire area along the x-direction on the basis of leak currents through all the signal lines 48 in the imaging area 38, to determine the gain depending on the contrast in this dose profile. Instead, the gain may be decided with reference to the contrast in such a dose profile that represents the density distribution in a limited area within the imaging area.

Figure 8:
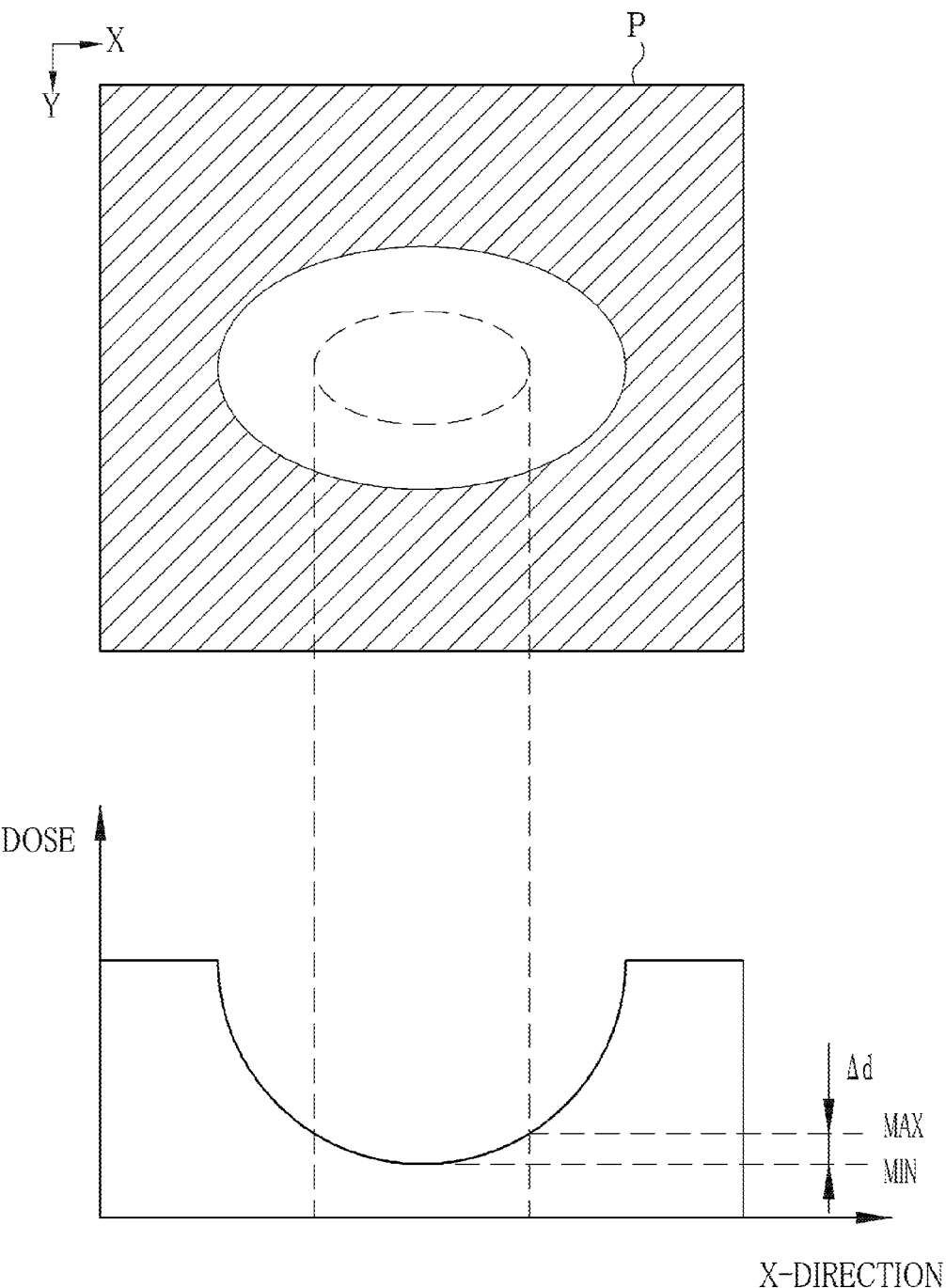
FIG. 8 is an explanatory diagram illustrating the contrast in an area of interest of the dose profile.

For example, as shown in FIG. 8, the gain may be determined based on a dose profile contrast (Δd) in a partial area, preferably an area of interest, of the subject. Determining the gain based on the contrast in the area of interest of the test subject H will reduce the affection of densities in other areas to the gain setting, so that the density gradation may be reproduced suitably for the density in the area of interest.

In this embodiment, the electronic cassette 21 may be positioned relative to the test subject H such that the center of the imaging area 38 is opposed to the area of interest. To the control circuit 41, a limited range of the dose profile is previously designated for detecting the contrast. The control circuit 41 calculates the contrast in the dose profile in the designated range, a limited range around the center of the imaging area 38 in this example, within the entire area of the imaging area 38. In this embodiment, it should be appreciated that the dose profile may be measured on the basis of leak currents through some of the signal lines 48 which correspond to the designated range, without the need for reading out the leak currents from all the signal lines 48.

Although the dose profile measuring operation starts after the end of x-ray radiation in the above embodiment, it is possible to start the dose profile measuring operation before the end of x-ray radiation, since the leak currents begin to flow through the signal lines 48 before the end of x-ray radiation. However, as described above, the time of arrival of the leak current at the integrating amplifiers 49 differs from line to line of the pixel array. Therefore, it is preferable to start the dose profile measuring operation after the end of x-ray radiation, at a timing that considers the time lags of the leak current arrivals.

Figure 9:
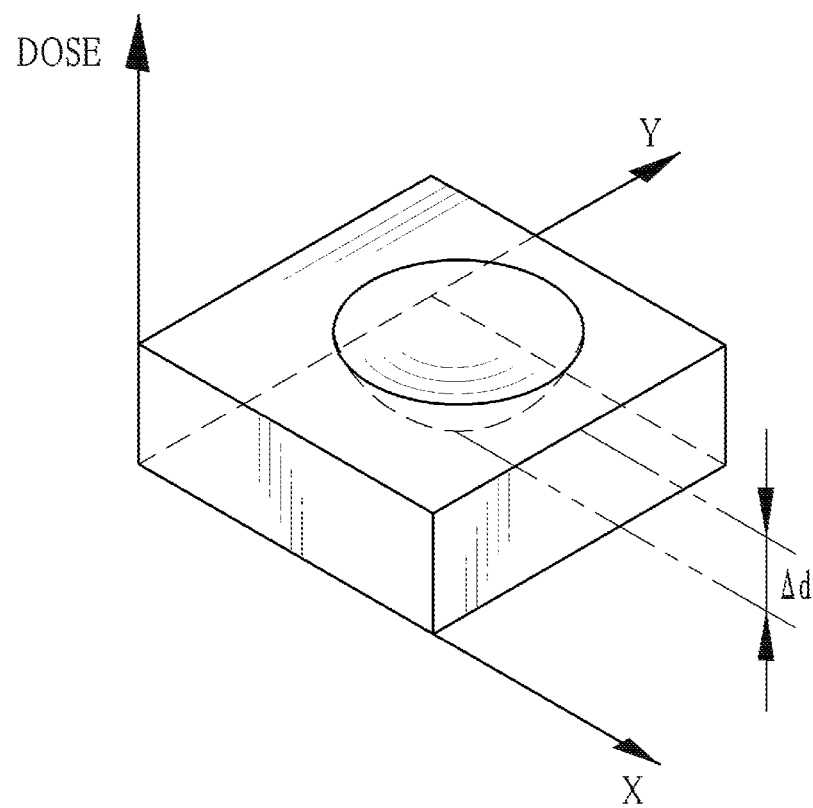
FIG. 9 is an explanatory diagram illustrating a two-dimensional dose profile.

In the above embodiment, the dose profile for use in deciding the gain is measured as a linear profile along the x-direction or line direction transverse to the signal lines 48 of the imaging area 38. In another embodiment, a dose profile may be measured two-dimensionally in the x-y directions, as shown for example in FIG. 9, to use for deciding the gain. The dose profile shown in FIG. 9 will be provided when the oval subject shown in FIGS. 3 and 8 is imaged. Because the two-dimensional dose profile represents the density distribution of all pixels in one frame, the gain determined depending on the contrast in the two-dimensional dose profile will achieve more adequate reproduction of the density gradation in the image.

Figure 10:
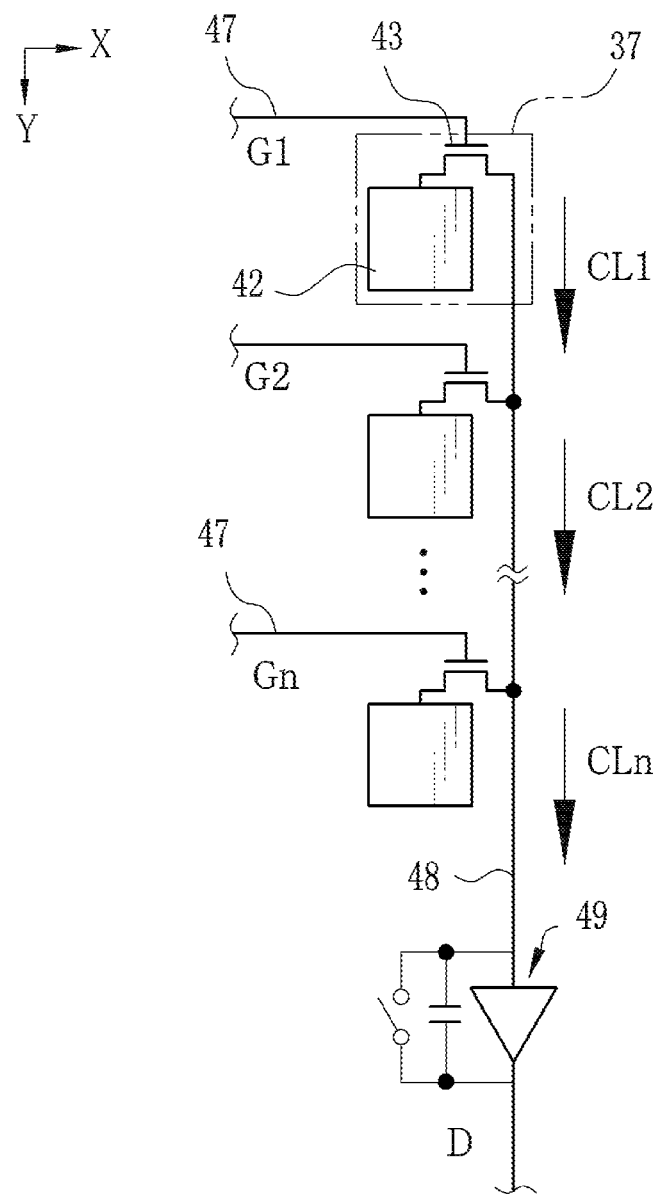
FIG. 10 is an explanatory diagram illustrating time lags between leak currents that flow from multiple pixels to an amplifier.

The two-dimensional dose profile may be measured based on the leak currents in the following manner:

As described above, the leak charges from the pixels 37 of one column are fed through one signal line 48 and get to the integrating amplifier 49 at different times according to the distances of the pixels 37 to the integrating amplifier 49. For example, as shown in FIG. 10, among the leak charges CL1 to CLn from the respective lines of the pixels 37, the leak charge CLn from the pixel 37 of the last line, the nearest pixel to the integrating amplifier 49, will be fed to the integrating amplifier 49 at first, and the leak charge CL1 from the pixel 37 of the first line will be fed to the integrating amplifier 49 at last.

Figure 11:
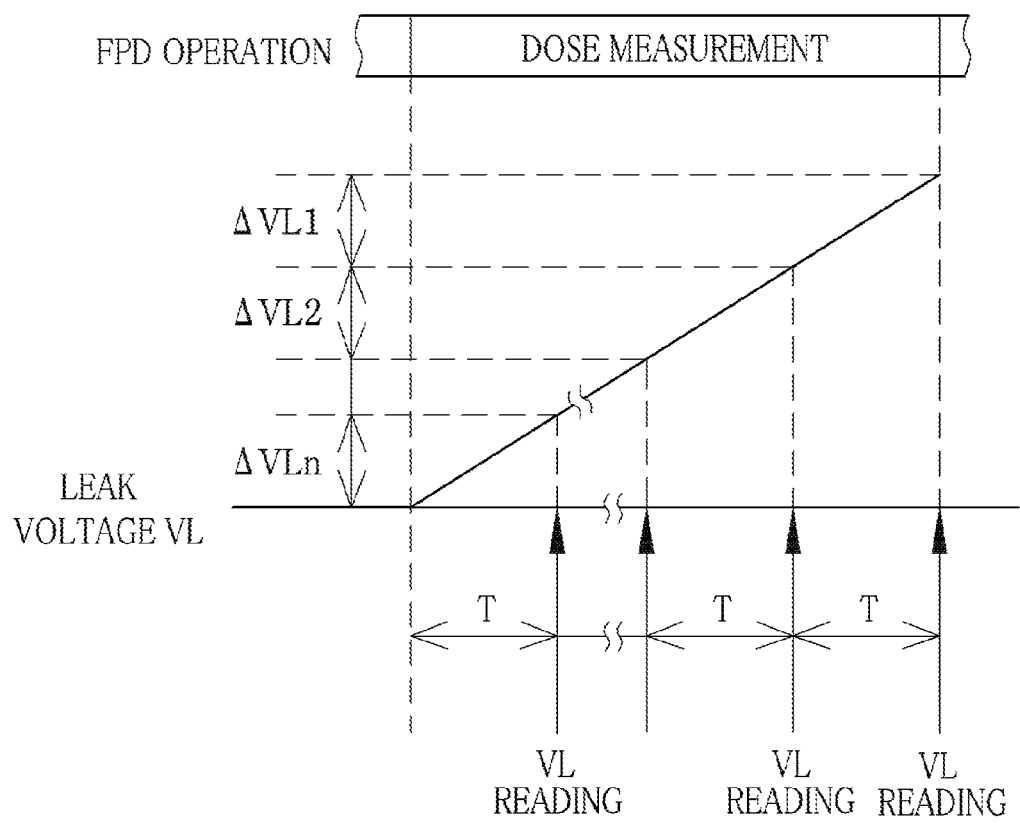
FIG. 11 is an explanatory diagram illustrating a method of reading leak voltages from the respective pixel lines.

As shown in FIG. 11, the integrating amplifier 49 accumulates the leak charges CL1 to CLn sequentially from the leak charge CLn to the leak charge CL1. Correspondingly, the leak voltage VL output from the integrating amplifier 49 increases with the accumulated amount of the leak charges CL1 to CLn. Since the leak charges CL1 to CLn from the respective lines arrive at the integrating amplifier 49 with the time lag from each other, the control circuit 41 reads out the leak voltages VL at corresponding intervals T to the time lag, and writes the read leak voltages VL sequentially in a built-in memory. As the latest leak voltage VL corresponds to the current cumulative leak charges CL, the control circuit 41 calculates the difference of the latest leak voltage VL from the previously read leak voltage VL, to determine leak voltage values $\Delta VL1$ to $\Delta VLn$ corresponding to the respective leak charges CL1 to CLn from the pixels 37 of the respective pixel lines.

The control circuit 41 measures the dose profile in the y-direction along each signal line 48 by plotting the corresponding leak voltage values $\Delta VL1$ to $\Delta VLn$. Then, the y-direction dose profiles along the respective signal lines 48 are arrayed in the x-direction to obtain the two-dimensional dose profile. Thereafter the control circuit 41 calculates the contrast between the maximum and minimum values of the measured two-dimensional dose profile, and decides the gain according to the calculated contrast, to set the amplifiers 53 at the decided gain.

In the above embodiment, the dose profile is measured based on the leak currents. Instead of the leak currents, the bias currents may also be used for measuring the dose profile, like in the above prior art.

Figure 12:
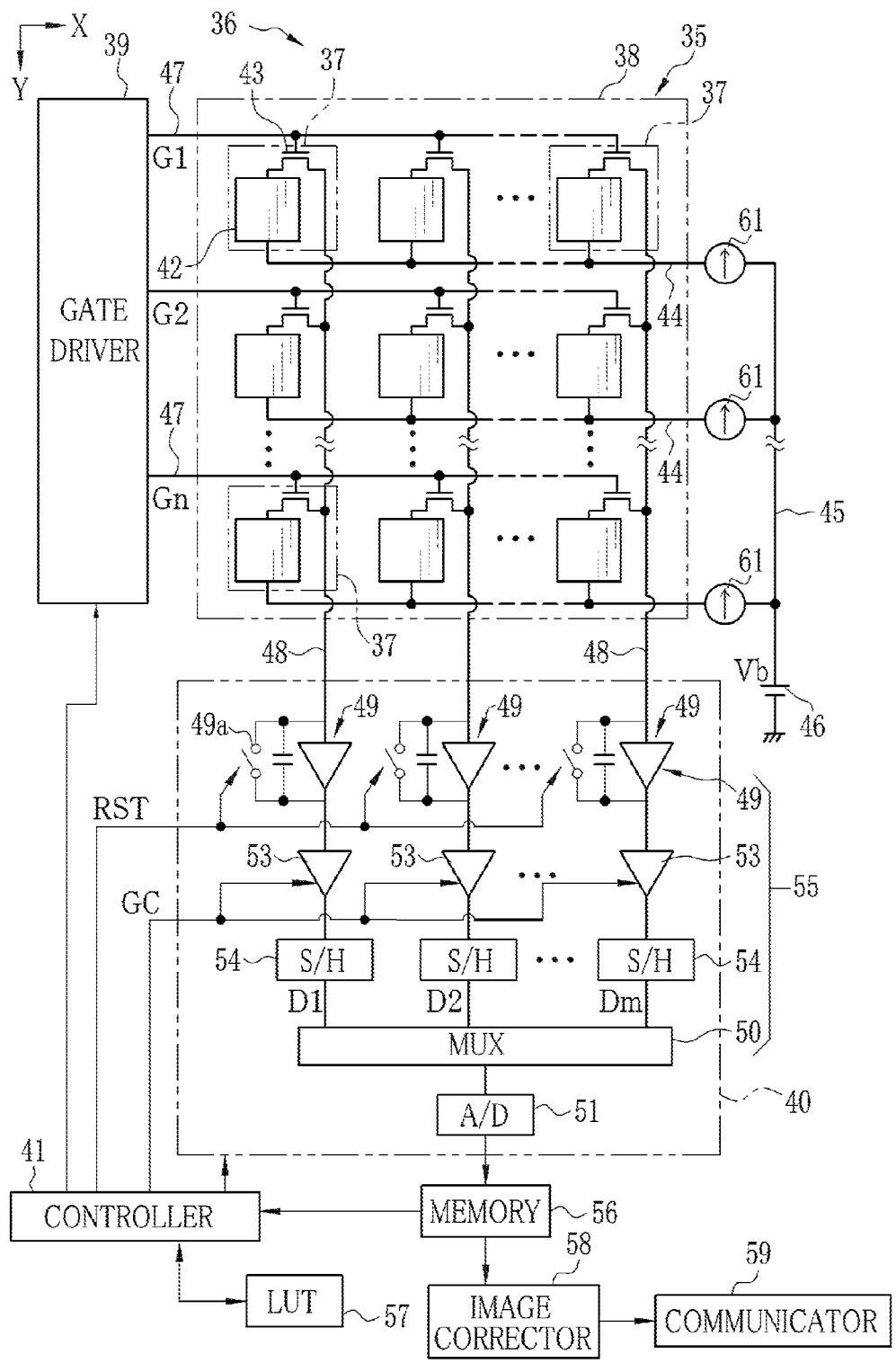
FIG. 12 is a circuit diagram illustrating an electric structure of a flat panel detector in accordance with an embodiment for measuring a dose profile based on bias currents.

In that case, as shown in FIG. 12, ammeters 61 are disposed on bias lines 44 which are each connected to one line of pixels 37 in the imaging area 38, so that the ammeters 61 measure the bias currents through the respective bias lines 44. The magnitude of the bias current from each pixel is proportional to the amount of charges accumulated in that pixel 37. Since each bias line 44 is connected to the pixels 37 of one line, the bias current flowing through each bias line 44 corresponds to a cumulative value of the charges accumulated in the respective pixels 37 of the corresponding line. The control circuit 41 reads out the measurement values from the ammeters 61 to determine linear x-direction dose profiles along the respective pixel lines. Since the bias lines 44 are provided one for each pixel line and arranged orthogonally to the signal lines 48 in the illustrated embodiment, the linear x-direction dose profiles are measured from the bias currents. Alternatively, bias lines may be arranged in parallel to the signal lines 48. Then linear y-direction dose profiles may be measured from the bias currents.

As described above, the bias currents may be substituted for the leak currents for use in measuring the dose profile. However, the dose profile measurement from the bias currents needs additional parts like the ammeters and hence additional costs therefor. Because the signal processing circuit 40 may be utilized for measuring the dose profile based on the leak currents, no additional cost of specific parts for the dose profile measurement is necessary when it utilizes the leak currents. More advantageously, the dose profile can be measured two-dimensionally based on the leak currents. For these reasons, the dose profile measurement based on the leak currents is preferred to that based on the bias currents.

It should be appreciated that the radiography system of the present invention is not to be limited to the above-described embodiments but various modifications may be possible without departing from the spirit and scope of the present invention.

In the above embodiment, the electronic cassette 21 detects the start of x-ray radiation upon receipt of the radiation start signal from the x-ray projector 11. Alternatively, the electronic cassette 21 may detect the start of x-ray radiation by itself without communicating with the x-ray projector 11. The electronic cassette 21 may detect the start of x-ray radiation in any of various methods such as monitoring a surge in the output voltage of the integrating amplifier 49 during the resetting operation, a surge in the leak voltage while the TFT 43 are off, or a surge in the bias current.

Also, the radiography system of the present invention is not to be limited to a stationary type installed in an x-ray room of a hospital but may include other types, such as a type boarded on a round-visit car, or a portable type, of which the x-ray source 13, the x-ray source controller 14, the electronic cassette 21 and the image acquisition controller 23 may be carried around for the emergency medical care at accident sites or disaster sites or for the home medical care.

In the above embodiment, the electronic cassette and the image acquisition controller are configured as separate members. The image acquisition controller may also be integrated into the electronic cassette, for example, by incorporating the function of the image acquisition controller into the control circuit of the electronic cassette.

Although the present invention has been described with reference to the electronic cassette as a portable radiographic image detector, the present invention is applicable to a stationary radiographic image detector.

Moreover, the present invention is applicable not only to x-ray radiography systems but also to other radiography systems using other kinds of radioactive rays like gamma-rays.

It should be understood that the embodiments of the present invention have been disclosed for illustrative purposes only. Those skilled in the art will appreciate that various modifications, additions and substitutions are possible without departing from the scope and spirit of the invention as disclosed in the accompanying claims.

What is claimed is:

1. A radiographic image detector for detecting a radiographic image of a subject from radioactive rays having been projected from a radiation source toward the subject and penetrated through the subject, said radiographic image detector comprising:
    a detection panel having pixels arrayed in a two-dimensional matrix in an imaging area exposed to the radioactive rays, each of said pixels accumulating signal charges corresponding to the dosed amount of radioactive rays on each pixel, switching elements turned off to accumulate the signal charges in said pixels or turned on to read out the signal charges from said pixels, and wiring lines conducting electric currents corresponding to the dosed amounts of radioactive rays on said pixels, each of said wiring lines being respectively connected to a line or a column of said pixels;
    a signal processing circuit including a voltage output circuit and an analog-to-digital converter, said voltage output circuit converting the signal charges read out from said pixels to a voltage signal while amplifying the voltage signal, said analog-to-digital converter converting the voltage signal to digital data at an output of said voltage output circuit;
    a dose profile measuring device for measuring a dose profile representative of at least linear distribution of the dosed amounts of radioactive rays within the imaging area, said dose profile measuring device measuring the dose profile by the currents flowing through said wiring lines while said switching elements are off and the signal charges are accumulated in said pixels; and
    a gain setting device for determining and setting a gain of amplifying the voltage signal in said voltage output circuit depending on contrast in the dose profile.

2. The radiographic image detector as recited in claim 1, wherein said gain setting device sets the gain the higher as the contrast in the dose profile becomes the lower.

3. The radiographic image detector as recited in claim 1, wherein the contrast in the dose profile is a difference between a maximum value and a minimum value in the dose profile.

4. The radiographic image detector as recited in claim 3, wherein said gain setting device determines the gain depending on the minimum value and the contrast in the dose profile.

5. The radiographic image detector as recited in claim 1, wherein the dose profile is measured from a portion of the imaging area.

6. The radiographic image detector as recited in claim 1, wherein said wiring lines are signal lines for reading out the signal charges from said pixels, each of said signal lines being respectively connected to a column of said pixels, and
    said dose profile measuring device measures the dose profile by leak currents leaking from said pixels to said signal lines while said switching elements are off.

7. The radiographic image detector as recited in claim 6, wherein said signal lines are respectively connected to said voltage output circuit, and
    said dose profile measuring device reads a leak voltage that said voltage output circuit outputs corresponding to the leak currents while said switching elements are off, to measure the dose profile.

8. The radiographic image detector as recited in claim 7, wherein said gain setting device sets the gain of said voltage output circuit at a maximum level while said dose profile measuring device is reading the leak voltage.

9. The radiographic image detector as recited in claim 7, wherein said dose profile measuring device detects the leak currents to measure the dose profile as linear distribution of the dosed amounts in the line direction of said pixels in the matrix.

10. The radiographic image detector as recited in claim 7, said dose profile measuring device measures the dose profile two-dimensionally making use of time lags in detection time of the leak currents from one line of said pixels to another after the start of radiation.

11. The radiographic image detector as recited in claim 10, wherein said dose profile measuring device starts measuring the dose profile after the end of radiation.

12. The radiographic image detector as recited in claim 1, wherein said wiring lines are bias lines for applying a bias voltage to said pixels, and
    said dose profile measuring device measures the dose profile by bias currents flowing through said bias lines while said switching elements are off.

13. A gain setting method for a radiographic image detector which comprises an imaging area having pixels arrayed in a two-dimensional matrix for accumulating signal charges corresponding to the dosed amount of radioactive rays on each pixel, switching elements turned off to accumulate the signal charges in said pixels or turned on to read out the signal charges from said pixels, wiring lines conducting electric currents corresponding to the signal charges accumulated in said pixels, a voltage output circuit for converting the signal charges read out from said pixels to a voltage signal while amplifying the voltage signal, and an analog-to-digital converter for converting the voltage signal to digital data, said gain setting method comprising the steps of:
    detecting the currents flowing through said wiring lines while said switching elements are off and the signal charges are accumulated in said pixels;
    measuring a dose profile representative of at least linear distribution of the dosed amounts of radioactive rays within the imaging area;
    detecting contrast in the dose profile;
    determining a gain of amplifying the voltage signal in said voltage output circuit depending on the contrast; and
    setting said voltage output circuit at the determined gain.

* * * * *